United States Patent [19]

Lööf et al.

[11] Patent Number: 4,484,020

[45] Date of Patent: Nov. 20, 1984

[54] CABLE DUCT

[75] Inventors: Göran Lööf, Gullspång; Lars Skarin, Otterbäcken, both of Sweden

[73] Assignee: Partex Fabriksaktiebolag, Gullspång, Sweden

[21] Appl. No.: 550,417

[22] Filed: Nov. 10, 1983

[30] Foreign Application Priority Data

Dec. 10, 1982 [SE] Sweden .............................. 8207095

[51] Int. Cl.³ .............................................. H02G 3/04
[52] U.S. Cl. .................................. 174/68 C; 138/168; 174/72 A; 174/101
[58] Field of Search ...................... 174/68 C, 72 A, 97, 174/101; 138/156, 157, 162, 163, 166, 168, 169; D13/13

[56] References Cited

FOREIGN PATENT DOCUMENTS

| 1352504 | 1/1964 | France | 174/72 A |
| 1436513 | 3/1966 | France | 174/72 A |
| 420308 | 3/1967 | Switzerland | 174/72 A |
| 609177 | 2/1979 | Switzerland | 174/68 C |

*Primary Examiner*—Laramie E. Askin
*Attorney, Agent, or Firm*—Sughrue, Mion, Zinn, Macpeak and Seas

[57] ABSTRACT

The invention relates to cable ducts and solves the problem of making it possible alternatively to close a given duct either with a lid (9) or by snapping engagement between portions (6, 7) directed inwardly from the top portions of the side walls (2, 3) of the duct. The snapping means (8, 11, 12) are shaped and located in such a way that they may alternatively cooperate either mutually (8, 11, 12) or with a lid (9, 10).

1 Claim, 7 Drawing Figures

CABLE DUCT

Cable ducts are usually made from an resilient synthetic resin material and given a rectangular cross-section. Such a duct has a bottom, a pair of side walls and a top portion which latter can be opened. According to the traditional lay-out, the top portion is constituted by a separate lid which, along its longitudinal lateral edges, has ribs directed downwards for the purpose of maintaining the lid in its mounted position by engagement with corresponding longitudinal grooves adjacent the upper edges of the side walls. Alternatively, each side wall is in its upper portion bent inwardly towards the center of the duct and provided with snapping means at the longitudinal edges of those portions. Such ducts are closed by mutual engagement of the snapping means.

Most users of cable ducts prefer the type having a separate lid, since the duct, in its closed state, then gets a more attractive appearance. Also, much less time is generally required for mounting or removing a lid than for bringing the side walls into or out of snapping engagement with each other.

However, in many applications it occurs that the electrical installation in question must either be supplemented with further apparatus or components or extended or modified in some other way to such an extent that, due to space limitations, it turns out to be impossible or, at best, very difficult to use lids. In such cases the revision of the installation must also comprise replacement of the ducts, more particularly replacement by ducts closed according to the snap-in principle. Another situation in which the last-mentioned duct type is preferred is when, in connection with work affecting the wires housed in the duct, it is necessary to get access to the interior of the duct at one or two points only, making it unnecessary to remove all of the long lid.

The main object of the invention is to provide a cable duct having such a configuration that the need of replacement is eliminated. This is, according to the invention, made possible thanks to the fact that the new duct may alternatively be closed with a lid or by a snapping action.

Cable ducts are manufactured in certain standardized sizes, the minimum bottom width being 25 mm. The width and height of the duct in the next size is 25 mm greater etcetera. This means that in most cases the duct is only partly filled by wires but does still occupy the same space in the installation as a duct the capacity of which has been utilized completely.

Therefore, a further object of the invention is to provide a cable duct the inner volume of which may be varied so that the duct, when there is need only for part of its interior volume, can be closed in such a way that its cross-sectional area, and hence its space requirement, is correspondingly reduced. This means a corresponding increase of the space available for other equipment, e.g. connector assemblies or electrical apparatus, because they may then be mounted nearer the duct than would otherwise be possible.

The characteristics of the invention have been set forth in the claim and one embodiment thereof is described below, reference being made to the drawing.

Figure 1:
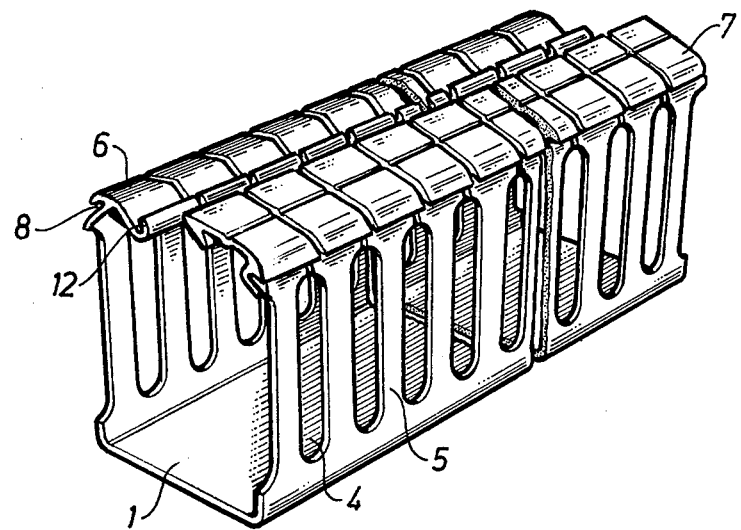
FIG. 1 is a perspective view showing a cable duct according to the invention in its opened position.
Figure 2:
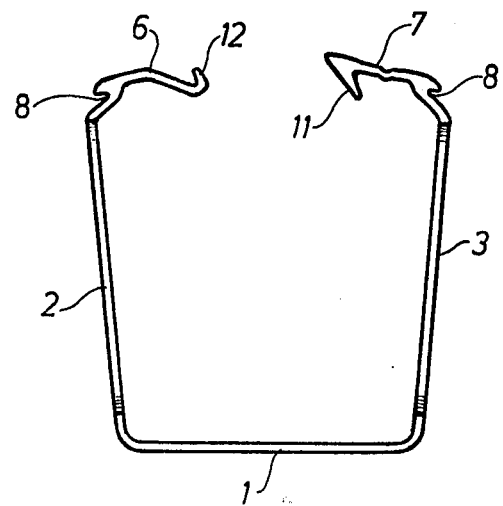
FIG. 2 is an end view of the duct in FIG. 1.
Figure 3:
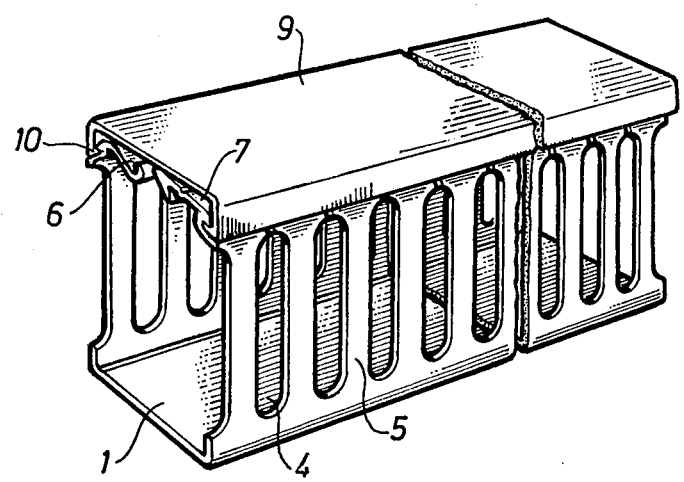
Figure 4:
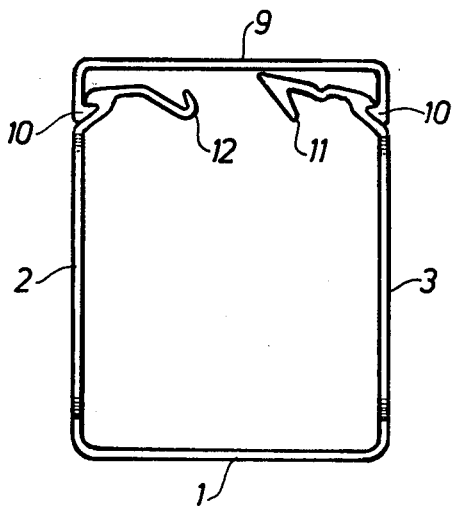

FIGS. 3 and 4 correspond to FIGS. 1 and 2, respectively, but show the duct closed by a lid.

Figure 5:
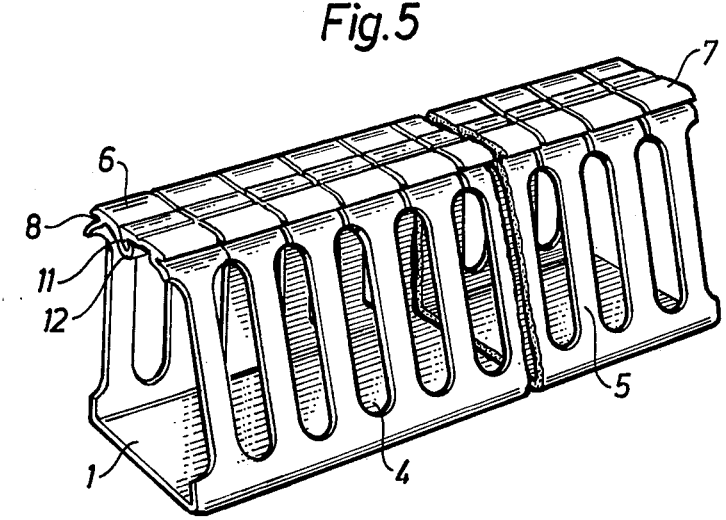
Figure 6:
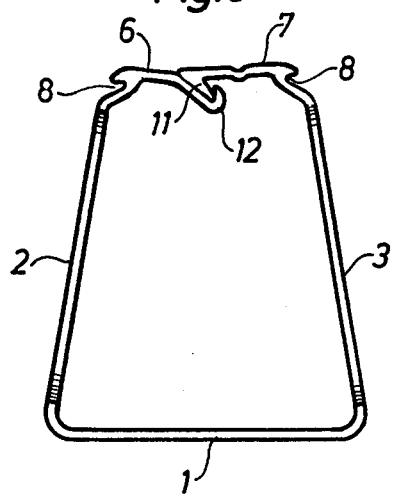

FIGS. 5 and 6 also correspond to FIGS. 1 and 2, respectively, but illustrate the duct closed by snapping action in a first engagement position.

Figure 7:
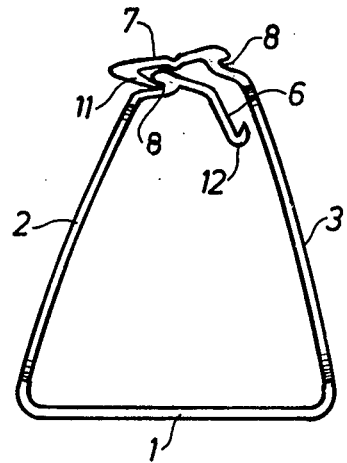

FIG. 7 corresponds to FIG. 6 but shows the duct closed in a second engagement position of the snapping means.

The cable duct illustrated is generally manufactured by extrusion of a resilient, synthetic resin material. It has a bottom 1 and two side walls 2, 3. The side walls have "windows" 4 for branched-off wires. Above the windows the walls are slit open so that each wall segment between an adjacent pair of windows forms a tongue 5. At the bottom of the windows those tongues are integral with each other and with the bottom of the cable duct. At their top they have inwardly bent portions 6, 7, provided with double snap-in locking means. At the corner between each side wall 2, 3 and the inwardly bent portion 6 and 7, respectively, there is an external longitudinal groove 8. When the duct is closed by a lid 9—FIGS. 3 and 4—inwardly facing ribs 10 along the longitudinal edges of the lid engage those grooves 8.

At their innermost free ends wall portions 7 are shaped like downwardly directed hooks 11 and the corresponding ends of wall portions 6 like upwardly directed hooks 12. In FIGS. 5 and 6 those hook-like portions have been brought into a snapping engagement with each other in the way that the upper portions of side walls 2, 3 have been pressed inwardly against the forces generated due to the resilience of the material and then released—compare FIG. 2.

In FIG. 7 side walls 2 and 3 have been pressed inwardly still more so that hooks 11 have passed the horizontal tongue portions 6 and instead engage the corner groove 8 between those portions and the upwardly directed side wall 2.

It appears from the drawing and from the description above that, thanks to the invention, any given cable duct may alternatively be closed with a lid or by snapping engagement. The transfer from use of a lid as shown in FIG. 4 to the snapping engagement locked position shown in FIG. 6 yields a relatively moderate decrease of the width of the duct at the top thereof, whereas in the second snapping position, illustrated in FIG. 7, that reduction is considerable.

As is understood, the invention as defined in the claim covers many embodiments in addition to the one above described for the purpose of illustration only. Generally speaking, the inventive idea resides in the realization that the top portions of the side walls may be given such a configuration that the duct may, alternatively, be closed with a lid or by a snapping engagement.

We claim:

1. A cable duct comprising a bottom (1) and two side walls (2, 3) the top portions of which (6, 7) are bent inwards and, adjacent the transition between each side wall (2, 3) and its inwardly directed portion (6, 7), provided with snapping means (8) arranged to engage corresponding snapping means (10) at the longitudinal edges of a lid (9), characterized in that, at their free ends, said top portions (6, 7) have hook-like snapping means (11, 12), the snapping means (11) of the one top portion (7) being arranged alternatively to engage either the snapping means (12) of the other top portion (6) or the snapping means (8) at the opposite side wall (2), whereby the duct may alternatively be closed with a lid (9) or in either of two different snapping-engagement positions giving the duct reduced cross-sections.

* * * * *